March 26, 1946.　　R. R. TEETOR　　2,397,220
PISTON RING
Filed April 17, 1941　　2 Sheets-Sheet 1
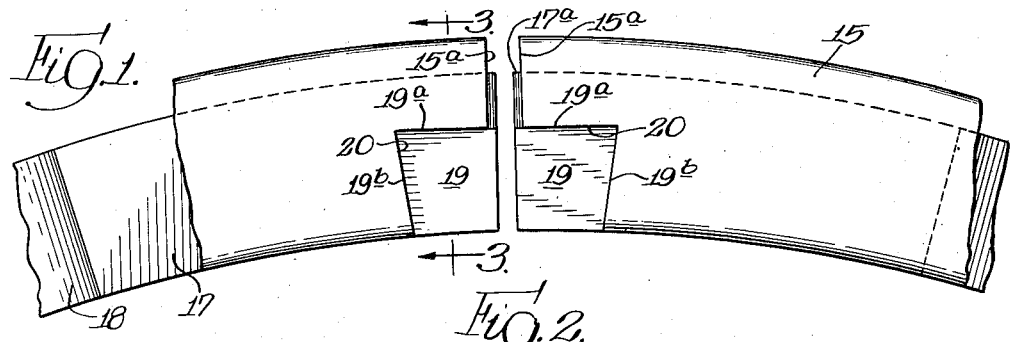
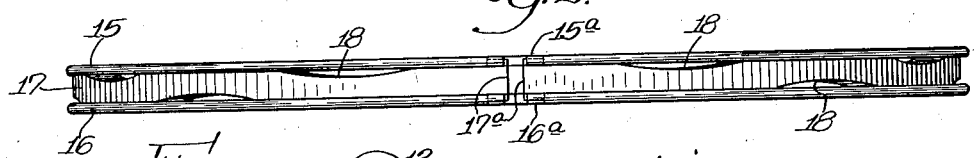
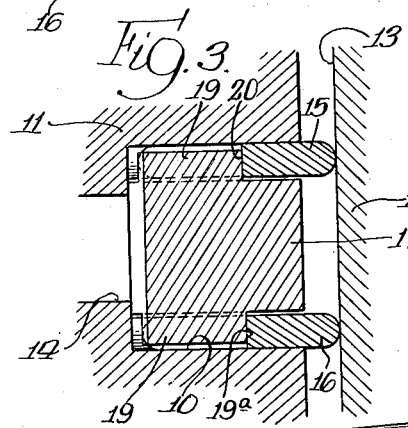 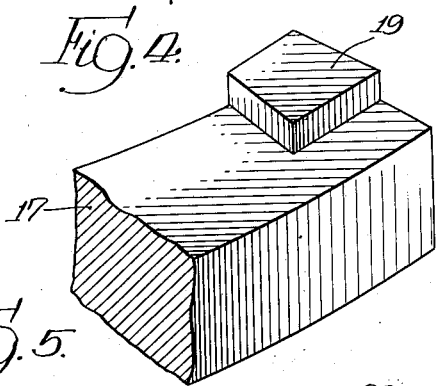
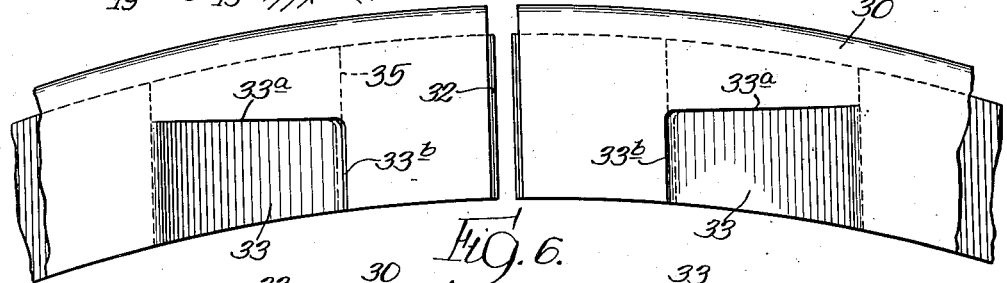
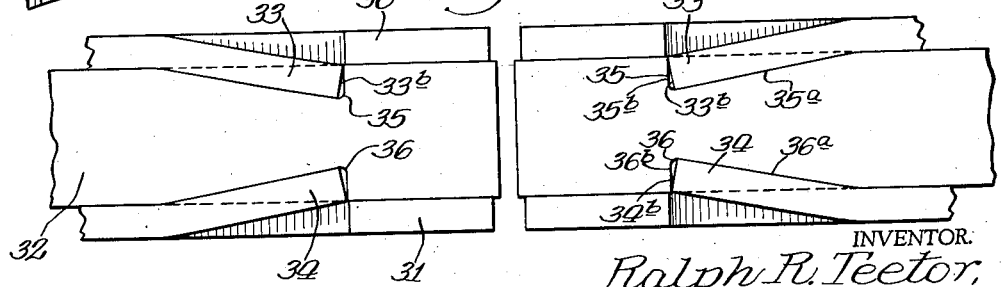
INVENTOR.
Ralph R. Teetor,
BY
Davis, Lindsey, Smith & Shonts, Atty's.

March 26, 1946.  R. R. TEETOR  2,397,220
PISTON RING
Filed April 17, 1941  2 Sheets-Sheet 2
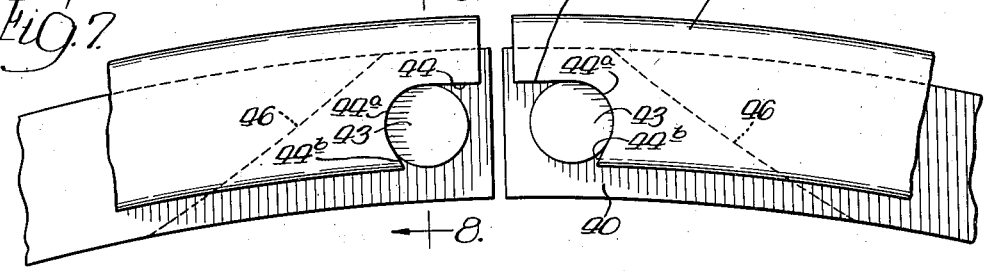
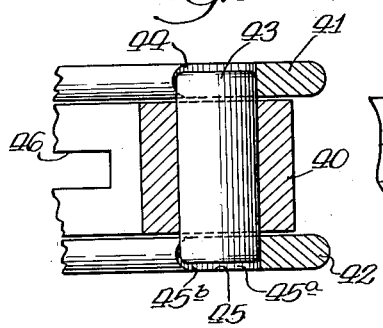
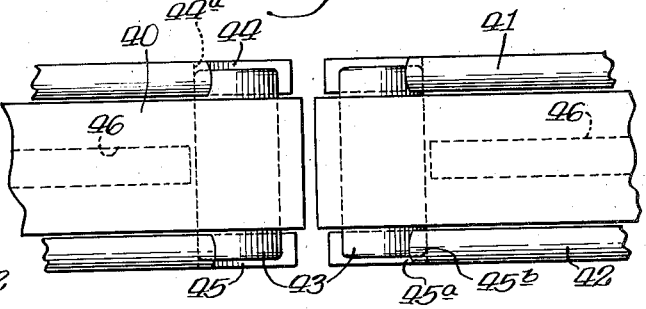
INVENTOR.
Ralph R. Teetor,
BY
Davis, Lindsey, Smith & Shonts, Atty's.

Patented Mar. 26, 1946

2,397,220

UNITED STATES PATENT OFFICE 2,397,220

PISTON RING

Ralph R. Teetor, Hagerstown, Ind., assignor to The Perfect Circle Company, Hagerstown, Ind., a corporation of Indiana Application April 17, 1941, Serial No. 388,920

5 Claims. (Cl. 309—45)

This invention relates to piston rings adapted for use in internal combustion engines. More particularly, the invention relates to a composite piston ring intended primarily for use in the oil groove of an internal combustion engine piston.

One of the principal objects of the invention is to provide an oil ring including thin rail sections which will maintain a substantially uniform and effective seal with the cylinder wall without excess unit pressure and which will efficiently remove any surplus oil from the wall of the cylinder and return it to the crank case of the engine.

Another object of the invention is to provide a piston ring for use in an internal combustion engine comprising thin steel rails arranged and constructed so as to maintain effective control over oil consumption while reducing to a minimum the wear on the walls of a cast iron cylinder.

Still another object of the invention is to provide a composite piston ring including one or more thin rails, and a spacer member adapted to maintain said rail or rails in position at the side or sides of a piston ring groove, said rails and spacer being so arranged and constructed that the need for an inner sinuous or corrugated thin ribbon expander to expand the rails and/or the spacer is obviated together with its inherent localized areas of high pressure against the rails. The elimination of an inner ribbon expander also removes the further problem and difficulty which such expanders have always presented to the art, namely, that resulting from the fact that piston ring grooves do vary in depth and in order to obtain the most efficient operation an expander must be designed for each particular size ring and with due regard to the depth of the groove which is to receive the ring.

A further object of the invention is to provide resilient spacing means arranged and constructed to exert both a circumferential and radial expansive force against one or more relatively thin rails to engage said rail or rails with a cylinder wall at a substantially uniform pressure throughout the periphery of the rails.

A still further object of the invention is to provide a composite ring including at least one cylinder wall engaging rail or section and an expander means for such section which will exert expansive force upon said section only adjacent the ends of said section.

Still another object of the invention is to provide novel interlocking means between a rail or rails of a composite piston ring and a spacer expander for said rails, and which interlocking means will maintain the ends or gaps of said rails and spacer in substantially vertical alignment at all times.

A still further object of the invention is to provide a composite ring structure having the sections thereof connected together in preassembled relation and with their gaps in alignment so that the ring assembly may be quickly and easily mounted as a unit in a piston ring groove.

The foregoing and other objects of the invention are attained by providing a piston ring of multipart construction comprising one or more split, thin, ring sections or rails, in combination with a relatively thick, split, resilient spacer-expander member, said spacer member being arranged to impart its relatively high inherent tension or expansive force to the rails preferably at or near their ends so as to widen the gaps in said rails and to urge said rails into intimate and substantially uniform engagement with a cylinder wall.

Referring now to the accompanying drawings:

Figure 1 is an enlarged fragmentary top plan view of the end portions of a composite ring structure constituting one form of the invention;

Fig. 2 is a side elevation of a complete ring having ends such as shown in Fig. 1, but being drawn to a relatively reduced scale;

Fig. 3 is a sectional view taken on the line 3—3 of Fig. 1 diagrammatically showing the ring mounted in a piston ring groove and with the rails of said ring in engagement with a cylinder wall;

Fig. 4 is a fragmentary perspective view of one end of the split ring spacer member shown in Fig. 1;

Fig. 5 is an enlarged fragmentary top plan view of the end portions of a ring structure embodying another form of my invention;

Fig. 6 is a fragmentary side elevational view of the inner face of the ring shown in Fig. 5;

Fig. 7 is an enlarged fragmentary top plan view of the end portions of a ring structure embodying a further form of my invention;

Fig. 8 is a sectional view taken on the line 8—8 of Fig. 7; and

Fig. 9 is a fragmentary side elevational view of the inner face of the ring structure shown in Fig. 7.

It will be understood that the clearances shown in the various views of the drawings have been exaggerated to facilitate illustration.

Referring now to Figs. 1 to 4 of the drawings, the multipart ring here illustrated is adapted to be placed in a groove 10 of an internal combustion engine piston 11. The piston 11 may be of conventional construction and adapted for operation within a conventional cast iron cylinder 12 having a wall 13 which is adapted to be engaged by the rings carried by the piston. However, for the sake of simplicity, the piston has been illustrated as provided with only a single ring conforming to the principles of the present invention. The piston 11 has the customary drain opening 14 at the back of the ring groove 10 to permit the return of oil to the crank case of the engine (not shown).

The piston ring shown in Figs. 1 to 4, inclusive, comprises a pair of thin, substantially flat split ring members or rails 15 and 16, respectively, adapted to be positioned at the opposite sides of the ring groove 10. These rails are preferably made of steel, although other materials, including cast iron, may be employed. The rails 15 and 16 are maintained in axially spaced relation and at the opposite sides of the piston ring groove 10 by an interposed relatively thick split expander ring member or spacer 17. The spacer 17 is also preferably made of steel, although other materials, including aluminum or cast iron, are suitable for this purpose, so long as they can function to supplement the expansive force of the rails 15 and 16. The manner in which the spacer-expander 17 acts to expand the rails 15 and 16 will be pointed out hereinafter.

The spacer 17 has the ends thereof 17ª separated by a substantial gap when the same is not confined within a cylinder. Said spacer may be termed a live or spring spacer inasmuch as it inherently tends to expand and widen the gap after it has been mounted upon the piston and is confined in a cylinder. The spacer 17 is also preferably cut away at circumferentially spaced intervals upon its upper and lower side faces so as to provide a series of staggered oil drainage openings 18 between itself and the adjacent surfaces of the side rails 15 and 16.

The spring spacer 17 is provided adjacent its ends with raised lug members or bosses 19 on its upper and lower faces, respectively, which serve the manifold purposes of interlocking the several ring sections together as a unit, maintaining the ends of the rails and spacer in vertical alignment, and transmitting expansive forces from the spring spacer to the rails 15 and 16, all as will be apparent hereinafter. The lugs 19 preferably are positioned adjacent the inner edges of the ends 17ª of the spacer and terminate short of the outer periphery of said spacer. The lugs or bosses 19 each have a straight non-concentric portion 19ª and an angular or non-radial straight portion 19ᵇ. Said bosses are adapted to be received in correspondingly shaped openings or notches 20 in the ends 15ª and 16ª of the rails 15 and 16, respectively. As is best shown in Fig. 3, the lugs 19 are of slightly less axial height than the axial thickness of the rails 15 and 16 so that said bosses do not engage the side walls of the ring groove 10.

The rails 15 and 16 have a greater external diameter than the spring ring spacer 17, when the ring is confined in the cylinder in which it operates as is clearly shown in Fig. 3, in order that only the outer peripheral edges of the rails may operatively contact with the cylinder wall 13.

It will be clear from the foregoing that the construction is obviously such that the rails 15 and 16 and the spring spacer 17 are adapted to be preassembled and interlocked at their ends against relative circumferential movement by means of the lugs 19 and the notches 20, and that their ends are always maintained in substantially vertical alignment. The ring can thus be mounted upon a piston as a unit. At the same time, the spacer 17 is free to move radially between said rails to maintain a continuous pressural engagement of the lugs 19 with the notches 20.

It will be evident that, with the ring mounted upon a piston in a cylinder, the spring spacer 17 will exert a tangential force on the rails 15 and 16 through the lugs 19, tending to widen the gaps of the rails and to urge said rails against the cylinder wall with materially higher tension or expansive force than is inherent in the rails alone. Simultaneously, the lugs 19 also transmit a radial force to the ends of the rails 15 and 16 to urge the same outwardly against the cylinder wall. The relatively high tension of the spring spacer 17 is thus imparted to the rails 15 and 16 at or near their ends only. The result of the application of the aforementioned forces is to urge the rails 15 and 16 into more effective sealing engagement with the cylinder wall with a more uniform pressure, and without producing any localized circumferentially spaced areas of high unit pressure as results when a conventional sinuous or corrugated thin ribbon expander or inner ring is used.

Another embodiment of my invention is illustrated in Figs. 5 and 6 of the drawings, the general principles of operation and advantages of which are the same as for the ring structure of Figs. 1 to 4, inclusive. However, this second ring structure differs mainly in the aligning and force transmitting means. As is shown, the thin split rails 30 and 31, which have also a greater external diameter than the relatively thick spring spacer 32, are provided with integral tongues 33 and 34. These tongues extend downwardly and upwardly from the top and bottom rails, respectively, and are positioned at the inner edges of the rails adjacent to but spaced slightly from their ends. The tongues 33 and 34 are shown inclined toward the gap between the ring ends, in Fig. 6. The tongues 33 include a straight nonconcentric edge portion 33ª and a nonradial edge portion 33ᵇ. The tongues 34 are shaped similar to the tongues 33. The tongues 33 and 34 are adapted to be received in correspondingly located notches 35 and 36, respectively, in the upper and lower faces of the spring spacer 32, said notches having an inclined bottom wall 35ª and 36ª, respectively, complemental to the adjacent surface of the inclined tongues 33 and 34. The notches 35 and 36 also include vertical end walls 35ᵇ and 36ᵇ adapted to engage with the end portions 33ᵇ and 34ᵇ of said tongues. The spacer 32 may be notched to provide oil drainage passageways similar to those in the spacer 17. The materials from which the parts are made may be the same as for the ring structure described in Figs. 1 to 4.

With the foregoing construction, the rails 30 and 31, and the spring spacer 32, may be readily assembled with their ends in substantial alignment and in interlocked relation prior to mounting the assembly as a unit in a piston ring groove. The end portions 33ᵇ and 34ᵇ of the tongues 33 and 34 are engaged by the vertical walls 35ᵇ and 36ᵇ of the notches 35 and 36, respectively, of the spring spacer 32 so that the relatively high inherent expansive force of the spacer 32 is effective to mainly produce a circumferential expanding action upon the rails 30 and 31, although the expander also preferably exerts some radial force upon the ends of the rails because of the peculiar interlocking engagement shown. The wall pressure of the rails 30 and 31 is thus effectively supplemented.

In Figs. 7, 8 and 9 there is shown another embodiment of the invention wherein the aligning and force transmitting means between the spring spacer 40 and the rails 41 and 42 takes the form of round cylindrical pins or studs 43 extending vertically through the spring spacer 40 adjacent its ends, said pins or studs being preferably press-fitted into the spacer and being adapted to be engaged in correspondingly located notches 44 and 45 formed in the ends of the rails at their inner edges. The notches 44 and 45 include portions having an arcuate surface 44ª and 45ª, respectively, adapted to be engaged by the circular pins 43, and a nonradial portion 44ᵇ and 45ᵇ which serves to interlock the rails 41 and 42 with the pin bearing spring spacer-expander ring 40. The portions 44ᵇ and 45ᵇ converge toward each other as shown in Fig. 7.

The pins or studs 43 project axially above and below the upper and lower surfaces of the spacer 40 a distance slightly less than the axial thickness of the rails 41 and 42. The rails 41 and 42 are of greater external diameter than the spacer 40 when confined in the cylinder in which the assembly is to operate, as is clearly shown in Fig. 8. The resilient spacer 40 is also provided with a series of circumferentially spaced elongated slots or oil vents 46 which extend radially through the central portion of the spacer and permit the drainage of oil therethrough.

In substantially the same manner as in the previously described embodiments, the relatively high radial and circumferential expansive forces of the resilient spacer-expander 40 are imparted to the rails 41 and 42 at or near their ends by the force transmitting means comprising the pins 43 and the notches 44 and 45, the foregoing arrangement of pins and notches also serving to maintain the ends of the rails and the spring spacer in substantial alignment for ready installation and for efficient operation after installation.

Although the foregoing description has set forth several embodiments of my invention, it will be understood that changes and modifications may be resorted to without departing from the spirit and scope of the appended claims.

I claim:

1. A piston ring structure for use in a piston ring groove of an internal combustion engine piston comprising: a thin, split rail adapted to be disposed at one side of a piston ring groove; a split spring ring member between said rail and the opposite side of said ring groove and retaining the said rail at the one side of the piston ring groove, said spring ring member having a tendency under its relatively great inherent tension to expand and widen its gap when confined within a cylinder; and tension transmitting means operatively interposed between the end portions only of said rail and said spring ring member for imparting to said rail only adjacent its ends the expansive force of said spring ring member, said rail being adapted to move inwardly and outwardly relative to said spring ring member except at its end portions.

2. A composite piston ring comprising: a pair of thin, split rails adapted to be positioned at the opposite sides of a piston ring groove; and expander means maintaining said rails in axially spaced relation, said expander means engaging said rails only adjacent their ends and being arranged to simultaneously exert circumferential and radial expansive forces adjacent said ends only, whereby said rails are adapted to move inwardly and outwardly relative to said expander means except at their ends.

3. A piston ring structure adapted for use in a piston ring groove of an internal combustion engine piston comprising: a pair of thin, split rails adapted to be disposed at the opposite sides of a ring groove; a split, spring ring member adapted to maintain said rails in spaced apart relation and having a tendency under its own relatively high inherent tension to expand and widen its gap when confined in a groove within a cylinder, the ends of said rails and the ends of said spring ring member being in substantial alignment; and tension transfer means operatively interposed between the end portions only of the rails and the spring ring member and comprising studs passing through said spring ring member and extending above and below the upper and lower faces of said spring ring member adjacent the ends thereof, said rails having openings adjacent their ends and positioned radially inward from their outer peripheral edge to receive the extended portions of said studs, whereby said rails and the spring ring member may be preassembled and mounted in a piston ring groove as a unit and the expansive force of said spring ring can be imparted to the rails adjacent their ends only so that said rails are adapted to move inwardly and outwardly relative to the spring ring member except at their ends.

4. A piston ring structure adapted for use in a piston ring groove of an internal combustion engine piston comprising: a pair of thin, split rails adapted to be disposed at the opposite sides of a ring groove; a split, spring ring member adapted to maintain said rails in spaced apart relation and having a tendency under its own relatively high inherent tension to expand and widen its gap when confined in a groove within a cylinder, the ends of said rails and the ends of said spring ring member being in substantial alignment; and tension transfer means operatively interposed between the end portions only of the rails and the spring ring member and comprising projecting elements on the upper and lower faces, respectively, of said spring ring member, said elements being positioned radially inward from its outer peripheral edge adjacent its ends, and correspondingly located notches in the ends of the rails adapted to receive said elements, whereby said rails and the spring ring member may be preassembled and mounted in a piston ring groove as a unit and the expansive force of said spring ring member can be imparted to said rails adjacent their ends only so that said rails are adapted to move inwardly and outwardly relative to the spring ring member except at their ends.

5. A piston ring structure adapted for use in a piston ring groove of an internal combustion engine piston comprising: a pair of thin, split rails adapted to be disposed at the opposite sides of a ring groove; a split, spring ring member adapted to maintain said rails in spaced apart relation and having a tendency under its own relatively high inherent tension to expand and widen its gap when confined in a groove within a cylinder, the ends of said rails and the ends of said spring ring member being in substantial alignment; and tension transfer means operatively interposed between the end portions only of the rails and the spring ring member and comprising tongues depending and raised from the top and bottom rails respectively, adjacent their ends and inwardly from the outer radial edges of the rails and notches in said spring ring member correspondingly located in the upper and lower faces thereof and adapted to receive and engage with said tongues, said tension transfer means serving to maintain the ends of said rails and the ends of said spring ring member in substantial alignment and to maintain said rails and spring member in preassembled condition for mounting in a piston ring groove as a unit and to impart to said rails adjacent their ends only the expansive force of said spring ring member whereby said rails are adapted to move inwardly and outwardly relative to the spring ring member except at their ends.

RALPH R. TEETOR.